Figure 1:
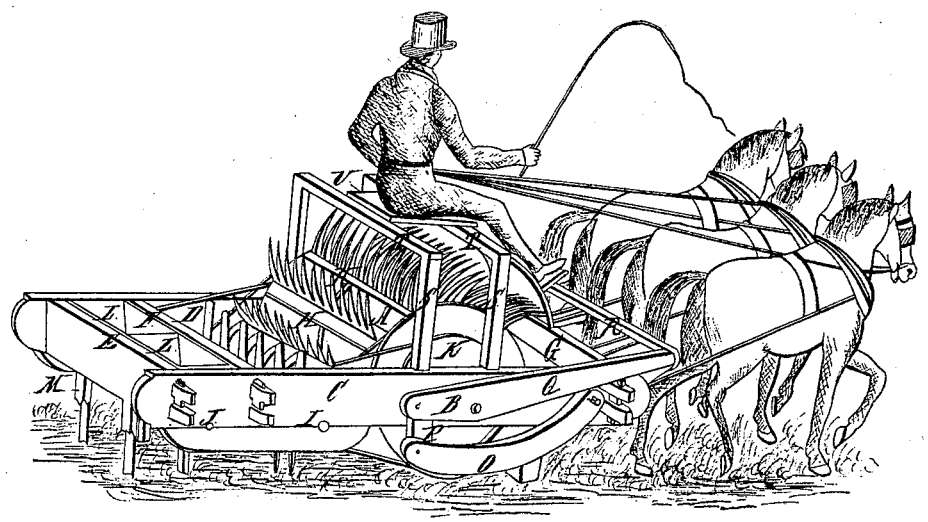
Figure 1:
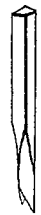
Figure 2:
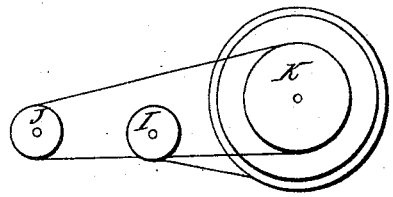
Figure 4:
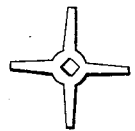
Figure 3:
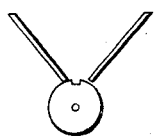

SCHERMERHORN & PORTER.

Rotary Cultivator.

No. 2,040.   Patented Apr. 10, 1841.

UNITED STATES PATENT OFFICE.

JNO. F. SCHERMERHORN, OF CARROLL COUNTY, INDIANA, AND RUFUS PORTER, OF NEW YORK, N. Y.

IMPROVEMENT IN AGRICULTURAL MACHINES FOR TILLING AND PLANTING AT THE SAME OPERATION.

Specification forming part of Letters Patent No. 2,040, dated April 10, 1841.

*To all whom it may concern:*

Be it known that we, JOHN F. SCHERMERHORN, of Carroll county, in the State of Indiana, and RUFUS PORTER, of the city, county, and State of New York, have invented a new and useful machine not hitherto used or known for breaking up and pulverizing the earth and planting or seeding at the same operation, and entitled the "Cylindric Tiller and Planter;" and we do hereby declare that of the construction and operation of this machine the following is a full and exact description.

A cylinder, A, seven feet long and three feet in diameter, has a shaft or axle extending through its center, with a pivot, B, at each end. These pivots pass through and support the sides C D of a square frame, C D E F G. This cylinder consists of solid heads and ten narrow planks, H, which extend from one cylinder-head to the other, being dovetailed into each, and thus constituting the periphery of the cylinder, but leaving an open space between each two planks. From each plank a row of iron teeth projects outward a little, curving and tapering to a point. These teeth are nine inches long, three inches wide at the cylinder, and five inches apart at the points, and curved in such a way that when the cylinder rolls forward on the ground the whole length of each tooth is made to enter the ground at the precise spot first marked and penetrated by the point thereof, and each row of teeth, when it begins to rise, lifts up a quantity of earth with it. In the rear of and parallel to this cylinder another shaft, with pivots I, extends across the frame, and on this shaft are mounted as many four-armed spiders, save one, as there are teeth in each row, and on each end of this shaft a pulley, over which a belt or endless chain passes, and also over the corresponding cylinder-head. Thus motion is communicated from the cylinder to the spider-shaft, and the arms of the spiders, when in motion, pass between the teeth of the cylinder, thus clearing them of the earth which they had raised, and which is by this process broken and pulverized.

In the rear of the spider-shaft is a small cylinder with pivots J at the ends thereof, and which is also put in motion rotarily by other belts, which pass over the ends of this cylinder and over the pulleys K, which are attached to the heads of the large cylinder.

Immediately over the small cylinder (which may be properly termed the "planting cylinder") are two hoppers, L L, of the form of inverted pyramids. These hoppers rest on cross-bars E and F, and in the bottom of each, which comes very nearly in contact with the cylinder, is an aperture about two inches square, whereby the corn or seed which may be contained in the hoppers comes in contact with a part of the cylinder. In those parts of the planting-cylinder which come in contact with the seeds are two small cavities of sufficient capacity to contain each the requisite quantity of seeds to be deposited at one place.

Immediately forward of each hopper an arm extends downward from the cross-bar F to the depth of four inches below the surface of the earth, and the sides of each arm being beveled in such a manner as to form an angle at the center of the forward surface, each arm in its progress forms a furrow, in which the planting-cylinder deposits the seeds at regular intervals. Immediately in the rear of these two other arms, M N, extend downward from the cross-bar E. The bottoms of these arms are forked, each terminating in two branches, so constructed as to form a ridge of earth between them, thus covering in its progress the seeds which are dropped in the furrows by the planting-cylinder. The bottoms of all of the vertical arms are fortified with iron plate. Two arms or shafts like those of a drag extend forward from the cross-bar G, and by which the machine is guided and managed by horses.

On the sides C C of the frame, near the front end thereof, are attached two curved slides or shoes, O O, one on each side. The forward end of each of these slides is connected by a pivot to the side of the frame. The other end extends back along the frame, and is attached by a connecting-rod to the rear end of a lever, Q, one of which is fixed to each side of the frame by a pivot, B, on which it turns. The other end of each lever extends forward of the frame, where they are connected to each other by a cross-bar, R. This arrangement is intended for raising the frame and cylinder from the ground, which is effected by the driver raising the cross-bar connecting the levers, and by this means forcing down the shoes or slides O, attached to the opposite end of the levers upon the ground.

To allow of a free motion between the lever, connecting-rod, and shoe, a mortise or slot is made in the rear end of both levers and shoes, to which the connecting-rod P is adapted by a tenon being formed on each end of it, which, when passed into the slots, are secured by pins passing through the slot and tenon. These slots are made wider than the tenon to allow of the latter having a play in them, the pins passing through the slots serving as pivots for the connecting-bar to turn upon.

From each side of the frame two posts, S S, extend upward two feet, and each is connected to its opposite by the cross-bars T T, and on these rests a plank seat, U, on which the driver sits.

What we claim as our invention, and wish to secure by Letters Patent, is—

1. Combining the large or cutting cylinder A and the revolving shaft of spiders I, arranged, as set forth, in an open frame, so constructed as to allow of their application to the purpose specified, as herein described.

2. In combination with the foregoing, the hoppers L and planting-cylinder J, the whole being constructed substantially as described.

3. In combination with the cylinder A and shaft of spiders I, arranged as set forth, the mode of raising the frame and cylinders from the ground by means of the shoes O and levers Q, the whole being combined, arranged, and operating substantially in the manner described.

JOHN F. SCHERMERHORN.
RUFUS PORTER.

Witnesses:
STEPHEN B. PEET,
LAMBT. M. FELTUS.